United States Patent Office 3,109,034
Patented Oct. 29, 1963

3,109,034
PREVENTING SELF-HEATING
Davenport Guerry, St. Albans, W. Va., assignor to Monsanto Chemical Company, St. Louis, Mo., a corporation of Delaware
No Drawing. Filed May 31, 1960, Ser. No. 32,597
14 Claims. (Cl. 260—647)

This invention relates to improvements in compositions containing materials which evolve heat at relatively low temperatures. It particularly relates to thermally stable compositions containing thermally unstable nitrosoaromatic compounds which begin to liberate heat at temperatures sometimes encountered during storage.

Many compounds containing nitroso groups have important industrial uses. For example, nitroso compounds are used in the manufacture of natural and synthetic rubber articles. These include nitrosoaromatic nitrosamines but unfortunately these compounds are seriously deficient in thermal stability. The instability is aggravated by presence of other organic materials, as for example small amounts of by-products formed during manufacture. Temperatures encountered during normal storage conditions may be high enough to start evolution of heat. Probably because of poor heat conductivity from the package, evolution of heat invariably continues resulting in gradually accelerated rates of decomposition and finally, conflagration. While it is common practice to mix the active ingredient with inert diluents or carriers, such as clay, this has not proved adequate.

It is an object of the invention to prevent or inhibit self-heating of compositions containing thermally unstable ingredients. It is also an object to provide thermally stable compositions containing thermally unstable materials. Another object is to provide compositions containing thermally unstable materials which do not self-heat, at least for extended periods at maximum temperatures reasonably expected during storage. A particular object is to provide compositions which either remain below temperature of incipient evolution of heat in an environment at higher temperatures or which reach temperature of incipient evolution of heat without continued self-heating. A further particular object is to provide thermally stable compositions containing nitrosoaromatic nitrosamines. Other and further objects will in part be particularly pointed out and in part obvious from the detailed description following.

The compositions of this invention contain stabilizing amounts of endothermically decomposable materials in admixture with a thermally unstable substance. The unstable ingredients particularly contemplated are those which become exothermic within the range of 35–125° C. and as stabilizers those which become endothermic within the same range. By decomposition is meant to separate into constituent parts or elements or into simpler components. This includes compounds which endothermically decompose by liberation of ammonia, carbon dioxide, water and the like. It includes dehydration through loss of water of crystallization. Other ingredients may be present as desired, as for example, ingredients to improve the physical form and for other purposes.

It has been discovered that two distinct reactions evolve heat from nitrosoaromatic nitrosamines. One reaction normally leads directly into the other and is not usually observed independently. The first reaction takes place in the vicinity of 80–90° C. when N,4-dinitroso-N-methylaniline is heated and is believed to be an exothermic polymerization reaction. Heat conductivity is poor from any significant amount of material and during bulk storage heat may continue to build up until a second reaction involving decomposition and ultimately, violent conflagration sets in. Actually, the heat evolved from first reaction is not especially large, being on the order of 33 calories per gram whereas that from the second is undoubtedly enormously greater. By eliminating or controlling the first reaction the composition remains thermally stable. After going through the first reaction the product is no longer thermally unstable. Thus, it is possible to stabilize compositions at temperatures below which the first reaction takes place although if unfavorable conditions persist until stabilizer is exhausted, the residue is thermally unstable. However, the protection is adequate under most circumstances.

Ammonium bicarbonate and ammonium carbonate comprise examples, endothermically decomposable substance which may be used to stabilize compositions at low temperature. These salts lose ammonia, carbon dioxide and water in the vicinity of 45° C. In their presence the temperature of the package remains at 45–50° C. although the environment may be considerably higher. While the stabilizing effect observed is believed to be due in large measure to the absorption of heat by endothermic decomposition reaction of the carbonate, the invention is in nowise confined to any theory of the manner in which the stabilizing agents function.

Salts having a high water of crystallization content are also very effective and preferable in cases where evolution of ammonia and carbon dioxide is objectionable. Moreover, heat of vaporization of the liberated water is available further to absorb heat. Among salts of this type, Epsom salts is preferred from the standpoint of economy, absence of ammonia and carbon dioxide and for the further reason that the water of crystallization is liberated stepwise and affords continuous protection over a wide temperature range.

The thermal stability and storage safety afforded by the new compositions was dramatically demonstrated by package tests carried out on 10 pound samples contained in fiber drums. The packages were placed in a hot room, the temperature of which was controlled at about 75° C. Thermocouples in the center of the packages were used to follow the temperature changes with time. The calcium silicate contained in the compositions employed in these tests described below was a product produced by a hydrothermal reaction of diatomaceous earth with a source of calcium. This form of calcium silicate has high liquid absorbing power. The average particle size was 0.02 micron, sp. g. 2.45, loose weight density 4.5 pounds per cubic foot, wet density 9 pounds per cubic foot, percent by weight of water absorption 560, pH 8.3, surface area 95 square meters per gram. The product is available from Johns-Manville Corp. under the trademark "Microcel E." The clay was a finely divided clay 55% of which was below 2 microns in size, sp. g. 2.55, pH 6.0–6.2, available under the trademark "Whitetex" from Southern Clays, Inc. The specially prepared calcium silicate was used to maintain a free flowing particulate form where water was present. It will be appreciated, however, that other inert fillers and carriers can be used and other porous water absorbents.

|  | Parts by weight ||||||
| --- | --- | --- | --- | --- | --- | --- |
|  | A | B | C | D | E | F |
| N,4-Dinitroso-N-methylaniline | 33 | 33⅓ | 33 | 33 | 33 | 33⅓ |
| Clay | 54.5 | 33⅓ |  |  |  | 33⅓ |
| Calcium silicate | 12.5 |  | 18.5 | 12.5 | 12.5 |  |
| Sodium bicarbonate |  | 33⅓ |  |  | 33 |  |
| Ammonium bicarbonate |  |  | 33 |  |  |  |
| Water |  |  | 15.5 | 21.5 | 21.5 |  |
| $MgSO_4 \cdot 7H_2O$ |  |  |  | 33 |  | 33⅓ |

| Composition | Observations |
|---|---|
| A | Caught fire in 7 hours. |
| B | Package reached maximum of 158° C. in 12 hours, then returned to ambient temperature. |
| C | Package remained at 45–50° C. until NH$_4$HCO$_3$ dissipated in 82 hours. |
| D | Package rose to 72° C. in 24 hours, then dropped to 55° C. in 120 hours. |
| E | Package rose to 68° C. in 24 hours, then dropped to 56° C. in 120 hours. |
| F | Package reached maximum of 160° C. in about 12 hours, then returned to ambient temperature. |

It will be observed that control composition A containing no stabilizer caught fire in 7 hours although the thermally unstable ingredient was only 33% by weight. The observations on composition B show that the material went through the first stage of the exothermic reaction but the sodium bicarbonate prevented the second stage and after reaching a maximum temperature of 158° C. the sample gradually returned to ambient temperature. The observations on composition C demonstrate that ammonium bicarbonate stabilized the package for an extended period by preventing any exothermic reaction whatsoever. The sample was of course absorbing heat from the hot room and not from the N,4-dinitroso-N-methylaniline because the sample temperature remained below the temperature at which self-heating takes place. The heat absorbed from the surroundings resulted in the continuous decomposition of the ammonium bicarbonate and when it was completely dissipated after about 82 hours, the residue was thermally unstable and soon caught fire. This composition would be quite safe for extended periods under the milder conditions of normal storage. Replacing the ammonium bicarbonate in C with sodium bicarbonate and MgSO$_4$.7H$_2$O respectively, stabilized the package at 55–60° C. Compositions D and E both went through the initial exothermic reaction although more gradually than composition B. Both samples reached thermal equilibrium in 13 days. Room temperature was then raised to 90° C. but there was no evidence of thermal decomposition. The fact that raising the room temperature to 90° C. after equilibrium was reached gave no evidence of heat evolution from the sample demonstrates thermal stability.

The thermal stability of the new compositions was also demonstrated by the technique of differential thermal analysis. Suitable apparatus was described by Deason et al., Industrial and Engineering Chemistry, September 1959, vol. 51, No. 9, part I, pages 997–1000. The temperature of compositions investigated was compared to that of an inert substance, i.e. one that was thermally stable and did not undergo phase changes over the temperature range studied. The experimental sample and the reference sample were both maintained in an oven, the temperature of which was gradually increased at uniform rate of ½ degree per minute. The temperatures of the reference sample and experimental sample were continuously recorded in order to follow the heat evolution. The temperature of the reference sample was not exactly that of the oven due to heat lag but the two will not be hereinafter differentiated. For convenience, reference sample temperature will be referred to as oven temperature. Deason et al. measured differences in temperature between reference and experimental samples by means of a differential thermocouple whereas determination of experimental sample temperatures were better suited to the purposes of this invention.

The results from differential thermal analysis of composition B closely paralleled the package tests. The temperature fell below that of the oven at about 85° C., then reached oven temperature again at 105° C. and proceeded to a maximum of 160° C. thereafter returning to oven temperature at 125° C. and following the oven temperature thereafter. Composition D dropped slightly below oven temperature at 82° C. and was only 105° C. when the oven was 143° C. The temperatures of the oven and experimental sample coincided at 160° C. The temperature of the experimental sample at no time exceeded the oven temperature. Composition E dropped below the oven temperature at 83° C. and was only 105° C. when the oven temperature was 147° C. The temperatures coincided at 160° C. and the experimental sample thereafter rose to a maximum of about 15° C. above oven temperature.

Other illustrative compositions subjected to differential thermal analysis by means of which increased stability was demonstrated are set forth below:

| | Parts by weight | | | | | |
|---|---|---|---|---|---|---|
| | G | H | J | K | L | M |
| N,4-Dinitroso-N-methylaniline | 100 | 33⅓ | 50 | 50 | 33⅓ | 33⅓ |
| Clay | | 66⅔ | | | 33⅓ | 33⅓ |
| (NH$_4$)$_2$CO$_3$ | | | 50 | | | |
| Ammonium acetate | | | | 50 | | |
| Ammonium bicarbonate | | | | | 33⅓ | |
| Na$_2$SO$_4$.10H$_2$O | | | | | | 33⅓ |

| Composition | Observations |
|---|---|
| G | Followed oven temperature to 80–90° C., then violently rose above 200° C. |
| H | Followed oven temperature to about 100° C., then became violently exothermic. The temperature went from 125 to > 200° C. in less than 2 minutes. |
| J | Temperature of sample 65° C. when oven temperature was 101° C. Began to decompose when oven 140 °C. |
| K | Began to exceed oven temperature slightly at 75° C., then when oven was 97° C. rose rapidly to 151° C. and returned to oven temperature. |
| L | Dropped below oven temperature at 80° C. and when oven temperature was 110° C. it was only 70° C. Subsequently decomposed. |
| M | The sample temperature dropped below oven temperature at 38° C. and remained at 38° C. until the oven temperature was 48° C. thereafter rising, coinciding with the oven temperature at 33° C. and again dropped below oven temperature at 85° C. reaching 102° C. when the oven temperature was 113° C. and thereafter rising to 142° C. after which it dropped back to oven temperature and subsequently decomposed when the oven temperature was about 120° C. |

It will be noted that purified N,4-dinitroso-N-methylaniline becomes self-heating at temperatures of 80–90° C. It was observed that in the presence of small amounts of impurities heat evolution may begin in the range of 40–45° C. However, the hereindescribed compositions either prevent or delay continuous exothermic reaction.

Measurable effects were not observed with

MgSO$_4$.7H$_2$O as low as 18% by weight of N,4-dinitroso-N-methylaniline but 45% (33% N,4-dinitroso-N-methylaniline, 52% clay and 15% MgSO$_4$.7H$_2$O) contributed unmistakable stabilizing action when subjected to differential thermal analysis. About 70 calories per gram are absorbed in the removal of 6 moles of water from the hydrated magnesium sulfate. Six moles are easily removed and the seventh with greater difficulty. Thus, removing 6 moles of water from 47 parts by weight of MgSO$_4$.7H$_2$O requires the heat expected from the first exothermic reaction of 100 parts by weight of N-4-dinitroso-N-methylaniline. The heat of vaporization of liberated water is then available as an added safety factor. Amounts within the range of 70–200 parts by weight of the stabilizing ingredients per 100 parts nitroso compound are preferred. Of course, higher amounts may be used but it is desirable to maintain the active ingredients in high enough proportion to avoid significantly diluting the rubber into which it is incorporated. The active ingredient should be at least 20% of the composition. In general, the stabilizer will be within the range of 50–400% of the unstable nitroso compound. The compositions may contain water within the range of 0–66% of the active ingredient and sufficient liquid absorbent to render them free flowing. In the case of the specially prepared calcium silicate described above, from 50–110% by weight of the water present gives satisfactory results. The water refers to free water and does not include water of crystallization which may be present. Other fillers, carriers and absorbents may be added or substituted such as diatomaceous earth, fuller's earth and bentonite. Diatomaceous earth of 300–400% water absorbing capacity is commercially available.

The particular endothermically decomposable substances employed will, of course, depend upon material to be stabilized and the results desired. Some commercially available salts, otherwise suitable, themselves present safety or toxicity hazards or may be too expensive to be practical. However, the following comprise examples of endothermically decomposable salts which may be used in the practice of the invention. It will be noted that the group contains metal salts, ammonium salts, hydrated metal hydroxide and mixtures thereof, and that salts include inorganic salts and salts of organic acids.

Al$_2$(SO$_4$)$_3$(NH$_4$)$_2$SO$_4$.24H$_2$O
Al$_2$(SO$_4$)$_3$K$_2$SO$_4$.24H$_2$O
Ba(OH)$_2$.8H$_2$O
Ca lactate, Ca(C$_3$H$_5$O$_3$)$_2$.5H$_2$O
CaSO$_4$.2Na$_2$SO$_4$.2H$_2$O
MgNH$_4$PO$_4$.6H$_2$O
MgCl$_2$.6H$_2$O
MgCO$_3$.3H$_2$O
MgSO$_4$.7H$_2$O
3MgCO$_3$.Mg(OH)$_2$.3H$_2$O
KNaCO$_3$.6H$_2$O
KHCO$_3$
Na$_2$CO$_3$.7H$_2$O
Na$_2$CO$_3$.10H$_2$O
NaNH$_4$HPO$_4$.4H$_2$O
NaHCO$_3$
(NH$_4$)$_2$CO$_3$.H$_2$O
NH$_4$HCO$_3$
(NH$_4$)$_2$CO$_3$.2NH$_4$HCO$_3$.H$_2$O
Cd(H$_2$PO$_4$)$_2$.2H$_2$O
CdNH$_4$PO$_4$.7H$_2$O
MgHPO$_4$.7H$_2$O
Mg$_2$P$_2$O$_7$.3H$_2$O
Na$_2$H$_2$P$_2$O$_6$.5H$_2$O
ZnSO$_4$.6H$_2$O It will be appreciated that proportions of the ingredients can vary quite widely. Other compositions prepared in stabilized particulate free flowing form included the following:

|  | Parts by weight | | | | |
| --- | --- | --- | --- | --- | --- |
|  | N | P | Q | R | S |
| N,4-Dinitroso-N-methylaniline | 35 | 24 | 33 | 33 | 33 |
| Water | 20 | 16 | 12 | 10 | 13.5 |
| Calcium silicate | 20 | 20 | 23 | 5 | 7.0 |
| Ammonium bicarbonate | 25 | 20 | 32 |  |  |
| Clay |  |  |  | 19 | 13.5 |
| MgSO$_4$.7H$_2$O |  |  |  |  | 33 |
| NaHCO$_3$ |  |  |  | 33 |  |

The thermally unstable nitrosoaromatic nitrosamines, with which the invention is particularly concerned, may be represented by the general formula

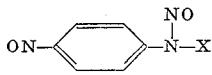

where X represents an alkyl group, an aryl group, an aralkyl group, an alicyclic group, an olefinic group or substituted derivatives of the aforementioned radicals, as for example cyanoethyl, chloroallyl, hydroxyethyl, carbomethoxyethyl and carboethoxyethyl. The nature of the active ingredients will be further apparent from the following typical examples:

N-methyl-N,4-dinitrosoaniline
1-nitroso-4-(p-nitrosophenyl)piperazine
N,N'-dinitroso-N,N'-bis(p-nitrosophenyl)ethylenediamine
3-(N,4-dinitrosoanilino)propionamide
N-ethyl-N,4-dinitrosoaniline
N-(2-chloroallyl)-N,4-dinitrosoaniline
N,4-dinitroso-N-propylaniline
2-(N,4-dinitrosoanilino)ethanol
N,4-dinitrosodiphenylamine
Methyl-N-nitroso-N-(p-nitrosophenyl)beta-alinate
N,4-dinitroso-N-butylaniline
N,4-dinitroso-N-heptylaniline
N,4-dinitroso-N-amylaniline
N,4-dinitroso-N-octylaniline
N,4-dinitroso-N-(2-cyanoethyl)aniline
N,4-dinitroso-N-cyclohexylaniline
N,4-dinitroso-N-benzylaniline However, the principles of the invention are applicable to other thermally unstable materials which may liberate heat during storage. Nitrosoaromatic compounds, by which is meant compounds having at least one nitroso radical attached to carbon in an aromatic ring, as a class have this failing. These include, for example, dinitrosobenzenes such as p-dinitrosobenzene. The enhanced safety to be obtained with such compositions as demonstrated by differential thermal analysis is illustrated below:

|  | Parts by weight | | | |
| --- | --- | --- | --- | --- |
|  | T | U | V | W |
| p-Dinitrosobenzene | 33⅓ | 33⅓ | 33⅓ | 50 |
| Clay | 66⅔ | 33⅓ | 33⅓ |  |
| MgSO$_4$.7H$_2$O |  | 33⅓ |  |  |
| NaHCO$_3$ |  |  | 33⅓ |  |
| Ammonium acetate |  |  |  | 50 |

| Composition | Observations |
| --- | --- |
| T | Began to exceed oven temperature at 117° C. When oven was 138° C., sample was in state of rapid decomposition and temperature suddenly increased to about 200° C. |
| U | Dropped below oven temperature at 47° C., reaching maximum differential when oven 137° C. at which time sample was about 108° C. Sample temperature rose thereafter and sample decomposed. |
| V | Sample temperature rose slightly above oven temperature at about 85° C. but was same as oven temperature at 147° C., then dropped below oven and remained 10–12° below oven temperature until oven was about 173° C. when exothermic decomposition began. |
| W | Sample temperature dropped slightly below oven temperature at about 85° C. and remained below oven temperature until the oven reached 180° C. |

It is apparent from the examples given that many different components in varying amounts may be utilized in the manufacture of compositions under the invention. It is impossible to attempt a comprehensive catalogue of useful components and their useful range. The protective capacity needed and protective capacity afforded by the stabilizing component vary. To formulate a set of specifications for composition in the light of the present disclosure will call for chemical knowledge but from his knowledge of materials available and their properties, a chemist can deduce with confidence their applicability to the purposes of the invention. Routine tests not of an inventive nature will provide reliable data. It is, of course, true that decomposable materials which absorb heat at too high a temperature and suitable decomposable materials in too low amounts would lead to no practical useful result. It is assumed that no one will wish to make a useless composition or will be misled because it is possible to misapply the teachings of the present disclosure in order to do so.

It is intended to cover all changes and modifications of the specification herein chosen for purposes of disclosure which do not constitute departures from the spirit and scope of the invention.

What is claimed is:

1. Composition comprising nitrosoaromatic compound which evolves heat within the range of 35–125° C. thermally stabilized by admixture with a stabilizing amount of a chemical substance selected from the group consisting of metal salts, ammonium salts, hydrated metal hydroxides and mixtures thereof which chemical substance decomposes endothermically within the same range with liberation of a member of the group consisting of water, carbon dioxide, ammonia and mixtures thereof, the said nitrosoaromatic compound constituting at least 20% of the composition.

2. Composition comprising nitrosoaromatic compound which evolves heat within the range of 35–125° C. thermally stabilized by admixture with a stabilizing amount of inorganic salt which decomposes endothermically within the same range, the said nitrosoaromatic compond constituting at least 20% of the composition.

3. Composition according to claim 2 in which the nitrosoaromatic nitrosamine compound is a nitrosoaromatic nitrosamine and the salt stabilizer is hydrated.

4. N,4-dinitroso-N-methylaniline rendered resistant to self-heating by having admixed therewith 50–200% by weight thereof of metal salt which decomposes endothermically within the range of 35–125° C. with liberation of a member of the group consisting of water, carbon dioxide, ammonia and mixtures thereof, the said N,4-dinitroso-N-methylaniline constituting at least 20% of the composition.

5. Composition of claim 2 in which the salt is $MgSO_4 \cdot 7H_2O$.

6. Composition of claim 2 in which the salt is sodium bicarbonate.

7. Composition of claim 2 in which the salt is ammonium bicarbonate.

8. A composition resistant to self-heating consisting essentially of N,4-dinitroso-N-methylaniline and 50–100% by weight of said dinitroso compound of inorganic salt which decomposes endothermically within the range of 35–125° C., free water within the range of 0–66% by weight of said dinitroso compound and sufficient water absorbent to render the compositon a free flowing particulate solid and inert non-absorbent carrier, the total of the water absorbent and non-absorbent carrier being within the range of 0–234% of the dinitroso compound.

9. A composition consisting essentially of 33⅓ parts by weight N,4-dinitroso-N-methylaniline, 33⅓ parts by weight clay and 33⅓ parts by weight sodium bicarbonate.

10. A composition consisting essentially of 33⅓ parts by weight N,4-dinitroso-N-methylaniline, 33⅓ parts by weight clay and 33⅓ parts by weight $MgSO_4 \cdot 7H_2O$.

11. A composition consisting essentially of 33 parts by weight N,4-dinitroso-N-methylaniline, 10 parts by weight water, 5 parts by weight water absorbent calcium silicate, 19 parts by weight clay and 33 parts by weight $NaHCO_3$.

12. A composition consisting essentially of 33 parts by weight N,4-dinitroso-N-methylaniline, 13.5 parts by weight water, 7.0 parts by weight water absorbent calcium silicate, 13.5 parts by weight clay and 33 parts by weight $MgSO_4 \cdot 7H_2O$.

13. p-Dinitrosobenzene rendered resistant to self-heating by having admixed therewith 100–400% by weight thereof of salt which decomposes endothermically within the range of 35–125° C.

14. Composition of claim 13 in which the salt is ammonium acetate.

References Cited in the file of this patent

UNITED STATES PATENTS

| | | |
|---|---|---|
| 2,432,511 | Davis et al. | Dec. 16, 1947 |
| 2,455,689 | Marple et al. | Dec. 7, 1948 |
| 2,481,080 | Castnes et al. | Sept. 6, 1949 |
| 2,798,860 | Hand et al. | July 9, 1957 |
| 2,885,277 | Fitzpatrick | May 5, 1959 |
| 2,914,913 | Zwicky | Dec. 1, 1959 |

OTHER REFERENCES

Degering: "An Outline of Organic Nitrogen Compounds," published by University Lithoprinters, Ypsilanti, Mich. (1950), pp. 164 and 165. QD251D4.

The Van Nostrand Chemist's Dictionary, published by D. Van Nostrand Co., N.Y. (1953), page 619, QD5V36.

Leeper et al.: C.A., vol. 51 8467(d) (1957).